United States Patent [19]

Nishimura et al.

[11] Patent Number: 5,091,796
[45] Date of Patent: Feb. 25, 1992

[54] OPTICAL COMMUNICATION SYSTEM HAVING AN IMPROVED PROTECTION LINE SWITCHING MECHANISM

[75] Inventors: Koichi Nishimura; Ikuo Taniguchi; Fumihiro Ikawa; Masumi Kurokawa, all of Yokohama, Japan

[73] Assignee: Fujitsu Limited, Kanagawa, Japan

[21] Appl. No.: 637,220

[22] Filed: Jan. 3, 1991

[30] Foreign Application Priority Data

Jan. 10, 1990 [JP] Japan ................................. 2-3153

[51] Int. Cl.[5] ...................... H04B 10/08; H04J 14/00
[52] U.S. Cl. ..................................... 359/110; 359/117
[58] Field of Search ........................ 370/1, 14, 16, 13; 455/8, 12; 375/40; 340/825.01, 827; 359/110, 117

[56] References Cited

U.S. PATENT DOCUMENTS

| | | | |
|---|---|---|---|
| 4,679,186 | 7/1987 | Lea | 370/16 |
| 4,680,776 | 7/1987 | Ikeuchi et al. | 375/40 |
| 4,967,406 | 10/1990 | Yagi et al. | 370/13 |

*Primary Examiner*—Edward L. Coles, Sr.
*Assistant Examiner*—Kinfe-Michael Negash
*Attorney, Agent, or Firm*—Helfgott & Karas

[57] ABSTRACT

A communication system includes a plurality of stations, a first working line coupling adjacent stations among the plurality of stations, a second working line passing predetermined stations among the plurality of stations without dropping therein, and a protection line provided in common for the first working line and the second working line, a supervisory signal always passing through the protection line. Each of the stations includes an internal circuit for receiving an input transmission signal from the first working line and sending an output transmission signal to the first working line. Each station also includes a switching portion for passing the protection line without dropping in each of the stations in a normal mode and for connecting the protection line to the internal circuit in an alarm mode so that the input transmission signal is received from an upstream side via the protection line instead of the first working line and the supervisory signal which is generated from the output transmission signal is output toward a downstream side via the protection line.

24 Claims, 7 Drawing Sheets

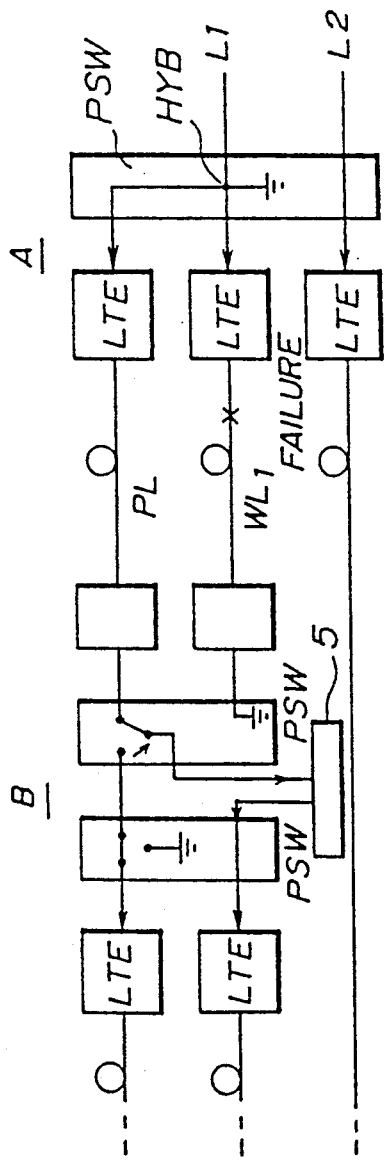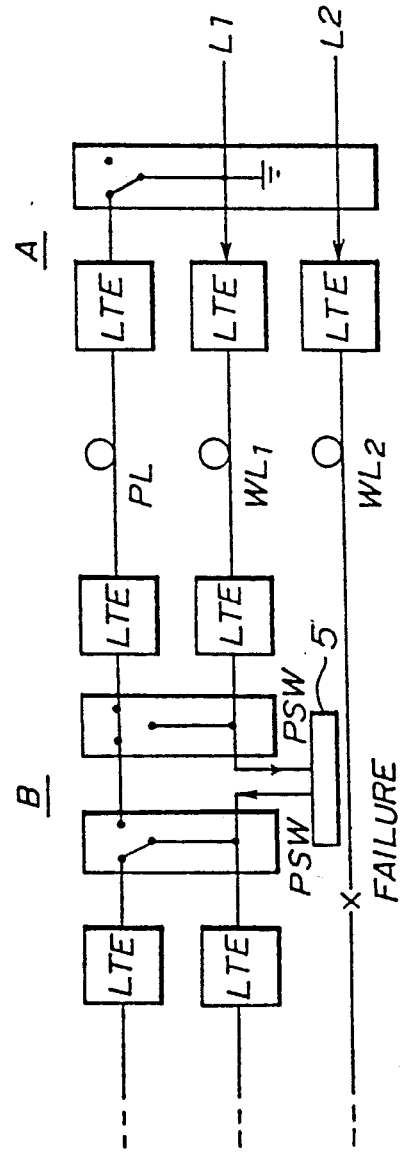
FIG. 3A PRIOR ART
FIG. 3B PRIOR ART ic # OPTICAL COMMUNICATION SYSTEM HAVING AN IMPROVED PROTECTION LINE SWITCHING MECHANISM

BACKGROUND OF THE INVENTION

The present invention generally relates to an optical communication system, and more particularly to a mechanism for switching a protection line provided in such an optical communication system when a failure has occurred.

There is known an optical communication system having optical fibers dropped in drop/insert stations and having optical fibers passing through stations without dropping them in these stations. Generally, such an optical communication system has a projection (redundant) optical fiber in order to provide for the occurrence of a failure.

Referring to FIG. 1, there is illustrated an optical communication system. The optical communication system shown in FIG. 1 has a terminal station A, and a plurality of drop/insert stations including drop/insert stations B and C. Lines L1 and L3 formed of optical fibers are dropped in (connected to) the drop/insert stations B and C. A line L2 formed of an optical fiber passes the drop/insert stations B and C without dropping therein. That is, the line L2 is not connected to the drop/insert stations B and C. It is possible to provide a protection line for each of the lines L1, L2 and L3. However, this arrangement needs a large number of lines and is thus more expensive.

For the above-mentioned reason, it is desirable to provide a protection line in common for the lines L1 and L3 dropped in the drop/insert stations B and C and line L2 passing these stations without dropping therein. In FIG. 1, a protection line includes portions PL1 and PL2 provided in common for the lines L1, L2 and L3.

In this case, two different arrangements of the protection line are available. FIG. 2A shows a first arrangement of the protection line, and FIG. 2B shows a second arrangement of the protection line. A protection line PL shown in FIG. 2A passes the station B without dropping therein, and the protection line PL shown in FIG. 2B is dropped in the station B. In the communication system shown in FIG. 2A, the terminal station A has a protection switch PSW having a hybrid circuit HYB (indicated by a dot for the sake of simplicity). A line LL1 of the terminal station A is branched into a working line WL1 and the protection line PL. A line terminating equipment LTE is provided between the protection line PL and the protection switch PSW. Similarly, a line terminating equipment LTE is provided between the working line WL1 and the protection switch PSW. A line LL2 of the terminal station A is connected to a working line WL2 via a line terminal equipment LTE.

As shown in FIG. 2A, the protection line PL passes the station B without dropping therein via two line terminal equipments LTE and two protection switches PSW of the station B. The working line WL2 passes the station B without dropping therein. The working line WL1 is dropped in the station B via a line terminating equipment LTE on the input side of the station B as well as the protection switch PSW, and goes out of the station B via the protection switch PSW and a line terminating equipment LTE on the output side thereof.

An internal circuit 5 is coupled to the working line WL1, as shown in FIG. 2A.

In the optical communication system shown in FIG. 2B, the protection line PL from the terminal station A is dropped in the drop/insert station B (the protection line PL is normally open), and the protection line PL extending from the drop/insert station B is inserted therein via a hybrid circuit HYB of the protection switch PSW on the output side of the drop/insert station B. The internal circuit 5 is coupled to the working line WL1, as shown in FIG. 2B.

The protection line PL in each of the optical communication systems shown in FIGS. 2A and 2B is continuously supplied with a supervisory signal (which corresponds to some of power of a signal passing through the working line WL1). Each of the line terminating equipments LTE in the working lines WL1 and WL2 supervises the corresponding working line, and generates an alarm signal when it detects a failure in any of the working lines WL1 and WL2. Each of the line terminating equipments in the protection line PL also supervises the signal on the protection line PL, and generates an alarm signal when it does not detect the supervisory signal. On the other hand, each of the line terminating equipments LTE does not generate the alarm signal when it detects that the supervisory signal is continuously supplied.

However, the two arrangements of the protection line PL shown in FIGS. 2A and 2B have the following disadvantages, which will now be described with reference to FIGS. 3A and 3B. As shown in FIG. 3A, when a failure shown by "x" has occurred in the working line WL1 of the optical communication system shown in FIG. 2A, the protection switch PSW on the input side of the drop/insert station B is switched so that the protection line PL extending from the terminal station A is used instead of the working line WL1. Thereby, the protection switch PSW on the input side of the drop/insert station B is connected to the internal circuit 5 thereof, and the working line WL1 is grounded. As a result, the insert/drop station B can continuously perform the receiving and sending operation. However, it becomes impossible to supply the supervisory signal to the protection line PL extending from the output side of the drop/insert station B. Any drop/insert station (not shown) located on the downstream side of the drop/insert station B detects the stop of supplying the supervisory signal, and generates the alarm signal irrespective of the fact that the protection line does not have any failure. This makes the maintenance operator confused.

As shown in FIG. 3B, when a failure occurs in the working line WL2 in the optical communication system shown in FIG. 2B, the protection line PL cannot function as a through line which passes each drop/insert station without dropping therein. It will be noted that the protection line is coupled to the internal circuit 5 of the drop/insert station B and extends therefrom toward the downstream side.

SUMMARY OF THE INVENTION

It is a general object of the present invention to provide an improved optical communication system having an improved arrangement of a protection line in which the above-mentioned disadvantages of the conventional arrangements are eliminated.

A more specific object of the present invention is to provide an optical communication system capable of definitely saving working lines having failures.

The above-mentioned objects of the present invention are achieved by a communication system comprising: a plurality of stations; a first working line coupling adjacent stations among the plurality of stations; a second working line passing predetermined stations among the plurality of stations without dropping therein; and a protection line provided in common for the first working line and the second working line, a supervisory signal always passing through the protection line. Each of the stations comprises: internal circuit means, connected to the first working line, for receiving an input transmission signal from the first working line and sending an output transmission signal to the first working line; and switching means for passing the protection line without dropping in each of the stations in a normal mode and for connecting the protection line to the internal circuit means in an alarm mode so that the input transmission signal is received from an upstream side via the protection line instead of the first working line and the supervisory signal which is generated from the output transmission signal is output toward a downstream side via the protection line.

The aforementioned objects of the present invention are also achieved by configuring each of the above stations so that each of the stations comprises: internal circuit means, connected to the first working line, for receiving an input transmission signal from the first working line and sending an output transmission signal to the first working line; and switching means for connecting the protection line to the internal circuit means in a normal mode so that the supervisory signal from an upstream side is dropped in each of the stations and for passing the protection line toward a downstream side without dropping therein in an alarm mode so that the protection line functions as the second working line.

BRIEF DESCRIPTION OF THE DRAWINGS

The above-mentioned objects of the present invention will become more apparent from the following detailed description,, when read in conjunction with the accompanying drawings, in which:

FIGS. 3A and 3B are block diagrams for respectively illustrating how the communication systems shown in FIGS. 2A and 2B operate when failures have occurred;

DESCRIPTION OF THE PREFERRED EMBODIMENTS

Figure 1:
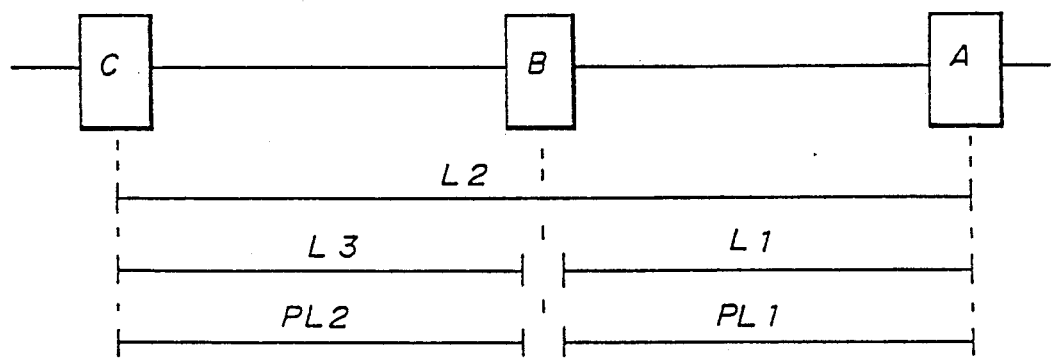
FIG. 1 is a block diagram of a conventional optical communication system.
Figure 2A:
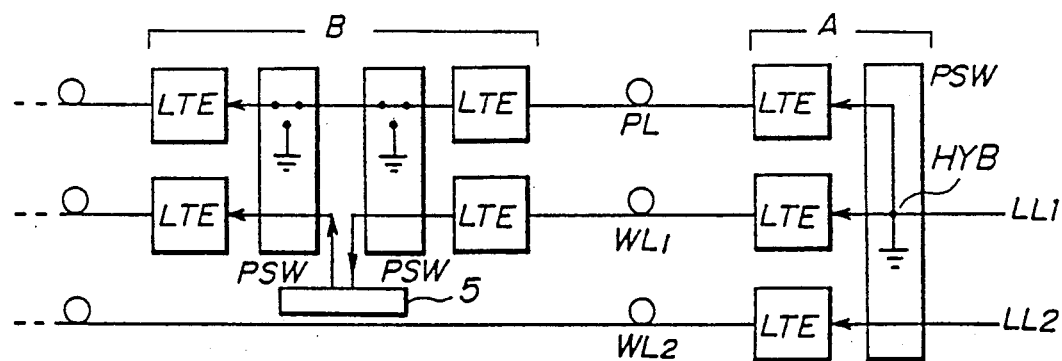
FIGS. 2A and 2B are block diagrams illustrating two conventional arrangements of protection lines.
Figure 2B:
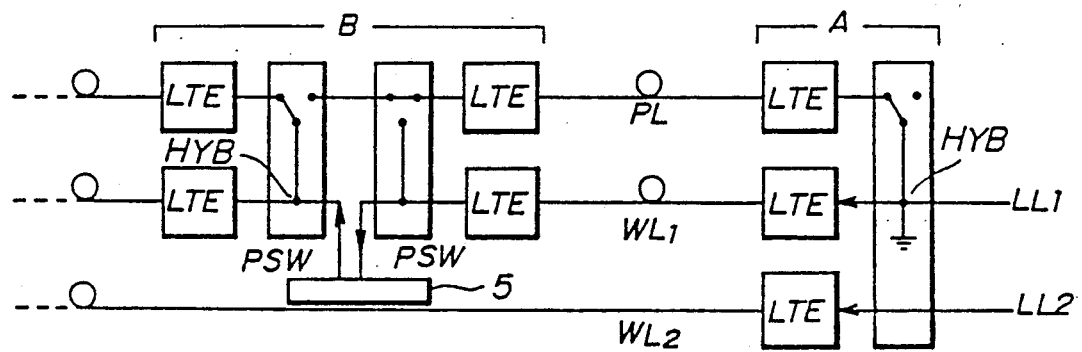
Figure 4:
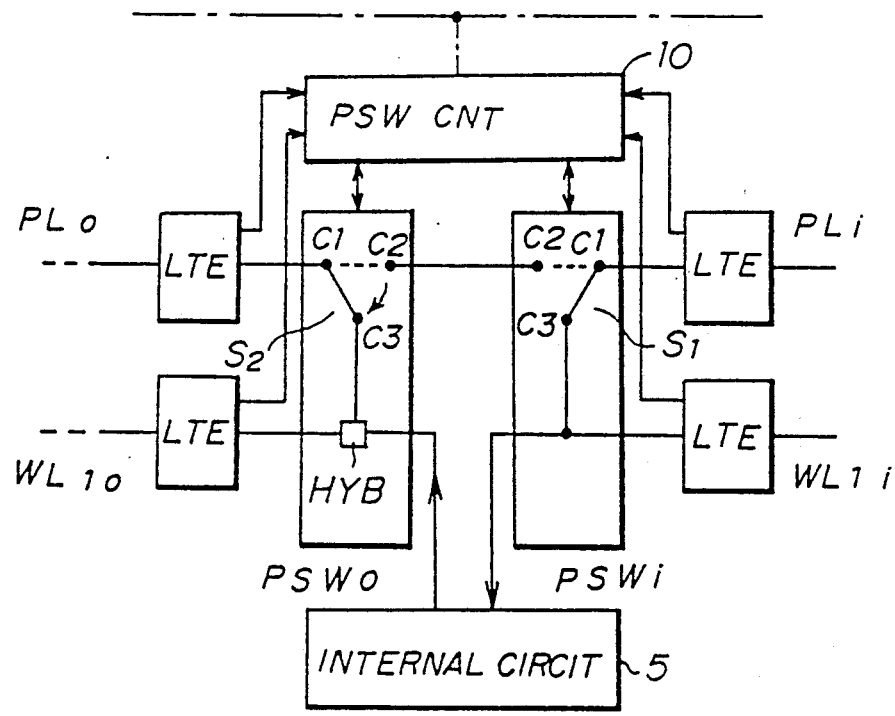
FIG. 4 is a block diagram of a drop/insert station according to a first embodiment of the present invention.

A description will now be given of a first preferred embodiment of the present invention with reference to FIG. 4. FIG. 4 illustrates a drop/insert station provided in an optical communication system. The drop/insert station shown in FIG. 4 has line terminating equipments LTE respectively coupled to a protection line PLi and a working line WL1i extending from another drop/insert station or a terminal station located on the upstream side of the drop/insert station shown in FIG. 4. The drop/insert station in FIG. 4 has a protection switch PSWi on the input side thereof, and a protection switch PSWo on the output side thereof. The protection switch PSWi has a switch S1. Each of the line terminating equipments LTE on the input side supervises the state of the corresponding working line, and outputs an alarm signal when a failure has occurred in the corresponding working line. The drop/insert station has a protection switch PSWo on the output side thereof. The protection switch PSWo has a switch S2 and a hybrid circuit HYB.

Figure 5:
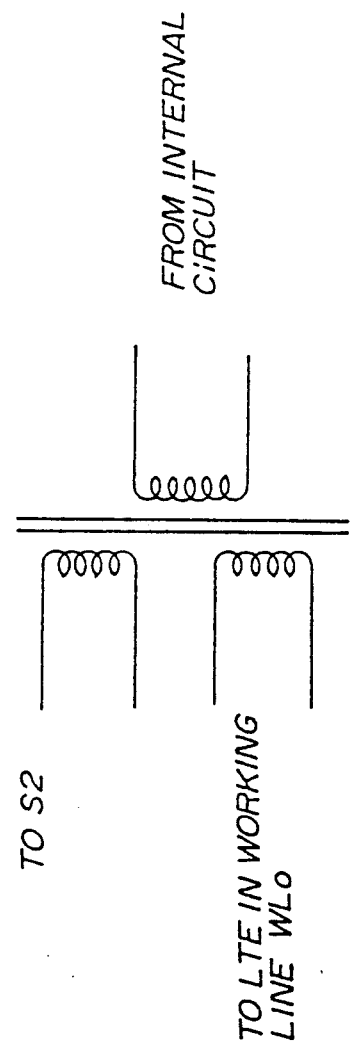
FIG. 5 is a circuit diagram of a hybrid circuit shown in FIG. 4.

FIG. 5 is a circuit diagram of an example of the hybrid circuit HYB of the protection switch PSWo. The hybrid circuit HYB couples the internal circuit 5 to two line terminating equipments LTE respectively provided for a protection line PLo and a working line WL1o. Each of the line terminating equipments LTE supervises the corresponding line and determines whether or not a failure has occurred therein. When a failure is detected, each of the line terminating equipments LTE outputs an alarm signal to a protection switch controller (PSW CNT) 10. The protection switch controller 10 controls the protection switches PSWi and PSWo on the basis of the alarm signal generated by any of the line terminating equipments LTE.

The switch S1 of the protection switch PSWi has a movable contact C1, and two stationary contacts C2 and C3. Similarly, the switch S2 of the protection switch PSWo has the movable contact C1, and two stationary contacts C2 and C3. The contact C1 of the switch S1 is connected to an output of the line terminating equipment LTE in the protection line PLi. The contact C2 of the switch S1 is connected to the contact C2 of the switch S2. The contact C3 of the switch S1 is connected to an input terminal of the internal circuit 5 as well as an output terminal of the line terminating equipment LTE which terminates the working line WL1i. The contact C3 of the switch S2 is connected to the hybrid circuit HYB. The output side of the hybrid circuit HYB is connected to an output terminal of the internal circuit 5.

When a failure has occurred in the working line WL1i, the line terminating equipment LTE related thereto detects the occurrence of this failure, and outputs the alarm signal to the protection switch controller 10 (alarm mode). In response to the alarm signal, the protection switch controller 10 controls the switches S1 and S2, as illustrated by the solid lines. That is, the switch S1 is controlled so that the contact C1 is connected to the contact C3, and the switch S2 is controlled so that the contact C1 is connected to the contact C3. The protection line PLi is dropped in the drop/insert station (internal circuit 5) via the switch S1. That is, the protection line PLi is used instead of the working line WL1i. On the other hand, some of the power of a signal generated by the internal circuit 5 (supervisory signal) is supplied to the protection line PLo via the hybrid circuit HYB and the switch S2 of the protection switch PSWo as well as the line terminating equipment LTE. As a result, current (supervisory signal) continuously passes through the protection line PLo, and thus each drop/insert station on the downstream side of the drop/insert station shown in FIG. 4 does not generate the alarm signal. On the other hand, when the working lines WL1i and WL1o work normally (normal mode), the protection switch controller 10 controls the switches S1 and S2, as shown by broken lines. That is, the switches S1 and S2 operate so that the line terminating equipment LTE in the protection line PLi is connected to the line terminating equipment LTE in the protection line PLo. That is, the protection line passes through the station in FIG. 4 without dropping therein. It should be noted that it is necessary to always pass the supervisory signal (some of the power of the signal passing through the working line) through the protection line in order to ensure that the protection line is normally working. The operation of the switches shown by the broken lines is also realized when a failure has occurred in a through working line (not shown for the sake of simplicity) such as the aforementioned working line WL2.

If a failure has occurred in the working line WL1o, the protection switch controller 10 controls only the switch S2 so that the contacts C1 and C3 are connected to each other. In this case, the switch S1 continuously connects the contacts C1 and C3 to each other.

Figure 6:
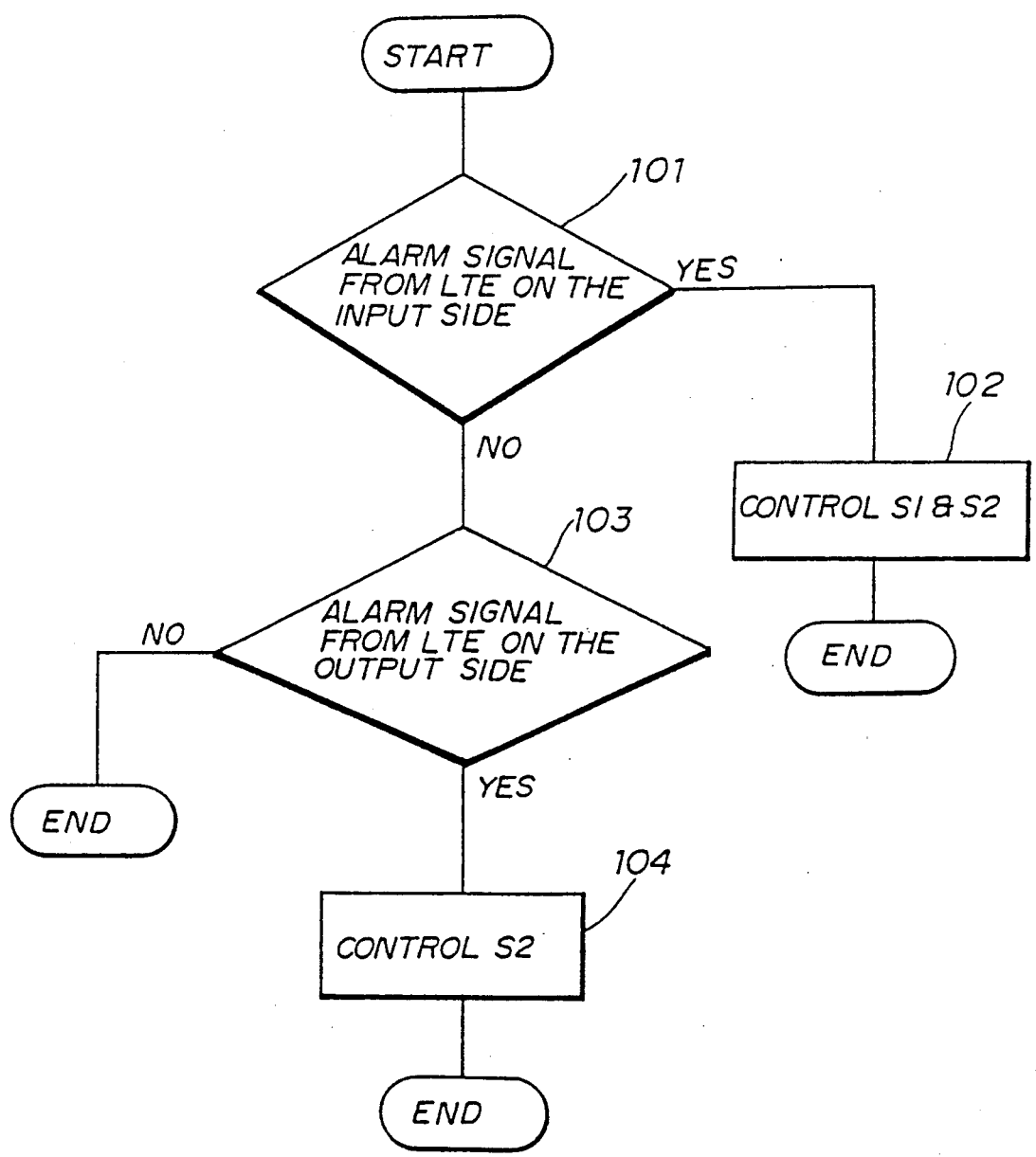
FIG. 6 is a flowchart of a procedure executed by a protection switch controller shown in FIG. 4.

It will be apparent that the protection switch controller 10 is formed of, for example, a logic circuit or a simple processor. FIG. 6 is a flowchart illustrating a program of a processor which functions as the protection switch controller 10. The program in FIG. 6 is always carried out repeatedly. At step 101, the protection switch controller 10 determines whether or not the alarm signal has been generated by the line terminating equipment LTE of the working line WL1i. When the result at step 101 is YES, at step 102, the protection switch controller 10 controls the switches S1 and S2 in the above-mentioned way. Then, the procedure ends. On the other hand, when the result at step 101 is NO, at step 103, the protection switch controller 10 determines whether or not the alarm signal has been generated by the line terminating equipment LTE. When the result is NO, the procedure ends. On the other hand, when the result at step 103 is YES, the protection switch controller 10 controls the switch S2 in the aforementioned way. Then, the procedure ends. Steps 101 and 103 are carried out for each working line.

A description will now be given of a second embodiment of the present invention with reference to FIG. 7, in which the parts which are the same as those shown in FIG. 4 are given the same reference numerals. The protection switch PSWi on the input side of the drop/insert station in FIG. 7 has a hybrid circuit H and a switch S3 instead of the switch S1 shown in FIG. 4. The hybrid circuit H has an arrangement as shown in FIG. 5. A two-wire input side of the hybrid circuit H is connected to the line terminating equipment LTE in the protection line PLi. One two-wire input side of the hybrid circuit H is connected to a first contact of the switch S3, and the other two-wire input side thereof is connected to the contact C2 of the switch S2. A second contact of the switch S3 is connected to the internal circuit 5.

When the alarm signal has been output by the line terminating equipment LTE which terminates the working line WL1i, the protection switch controller 10 controls the switch S3 so that the hybrid circuit H is connected to the internal circuit 5 via the switch S3, and controls the switch S2 so that the contacts C1 and C3 are connected to each other. In this case, the switch S2 may continuously select the contact C2, since the supervisory signal from the protection line PLi is applied to the contact C2 of the switch S2 via the hybrid circuit H of the protection switch PSWi. On the other hand, when the alarm signal has been output by the line terminating equipment LTE in the working line WL1o, the protection switch controller 10 controls only the switch S2 so that the contacts C1 and C3 thereof are connected to each other.

When there is no failure in the working lines WL1i and WL1o, the switch S3 is open and the switch S2 connects its contacts C1 and C2. The above state is also set when a failure has occurred in a through working line (not shown for the sake of simplicity).

Figure 8:
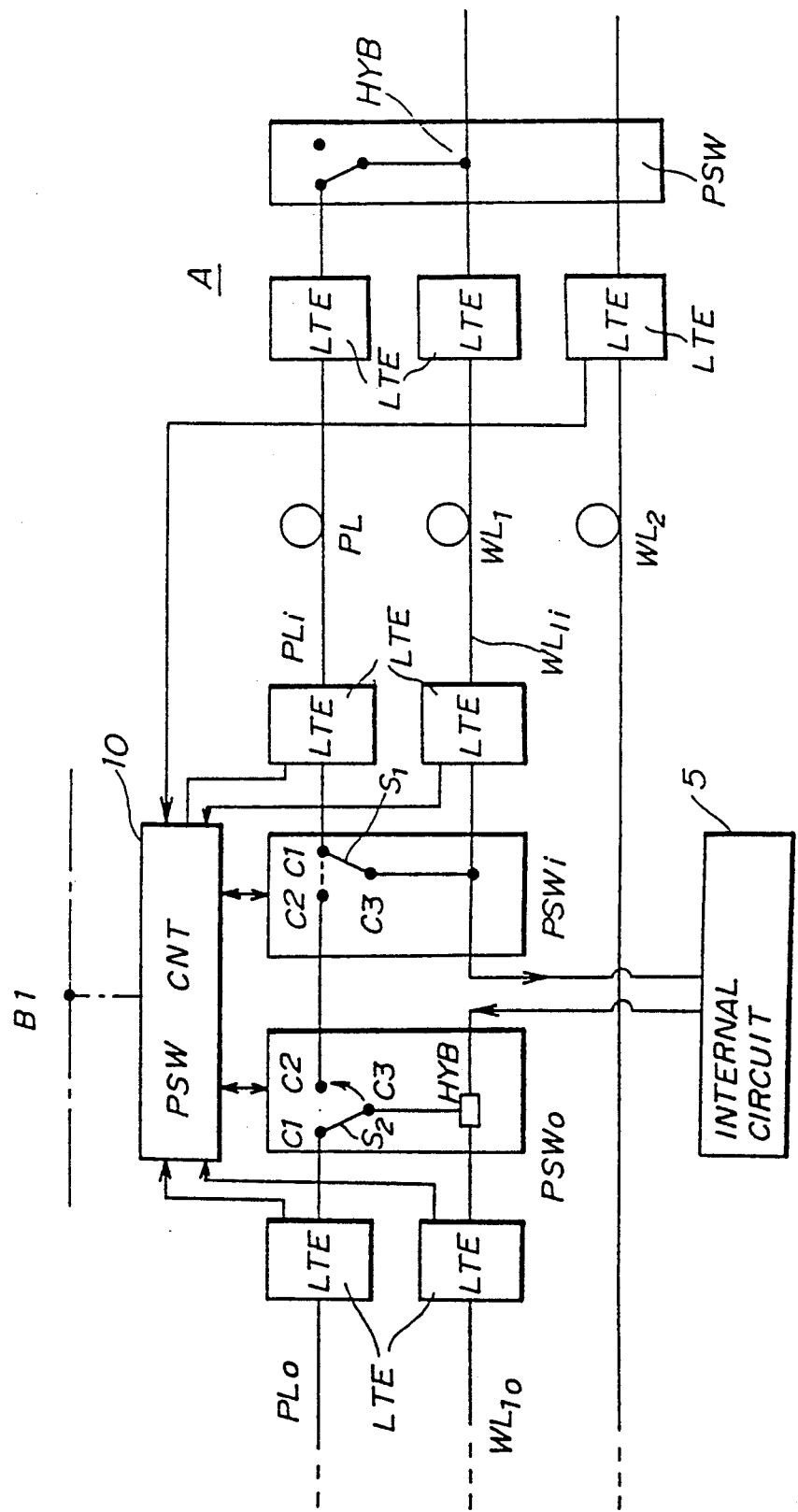
FIG. 8 is a block diagram of a drop/insert station according to a third embodiment of the present invention.

FIG. 8 is a block diagram of a preferred third embodiment of the present invention. In FIG. 8, those parts which are the same as shown in FIG. 4 are given the same reference numerals. In the arrangement shown in FIG. 8, normally, the switch S1 of a drop/insert station B1 connects the contacts C1 and C3, and the switch S2 connects the contacts C1 and C3. That is, the protection line from the upstream side is dropped in the drop/insert station B1, and extends therefrom toward other stations on the downstream side. The line terminating equipment LTE in the working line WL2 (or a line terminating equipment LTE on the downstream side) outputs the alarm signal to the protection switch controller 10.

When a failure has occurred in the working line WL2 which passes the drop/insert station B1 without dropping therein, the line terminating equipment LTE in the working line WL2 outputs the alarm signal to the protection switch controller 10. In response to the alarm signal, the protection switch controller 10 controls the switches S1 and S2 so that the switch S1 connects the contacts C1 and C2 to each other and the switch S2 connects its contacts C1 and C2. As a result, the protection line including the protection lines PLi and PLo passes the station B1 without dropping therein.

In each of the first, second and third embodiments of the present invention, the end terminal A outputs the supervisory signal having a power approximately half that of each signal in any of the working lines, and each drop/insert station outputs the supervisory signal having 10–20% of the power of each signal in any of the working lines.

Figure 7:
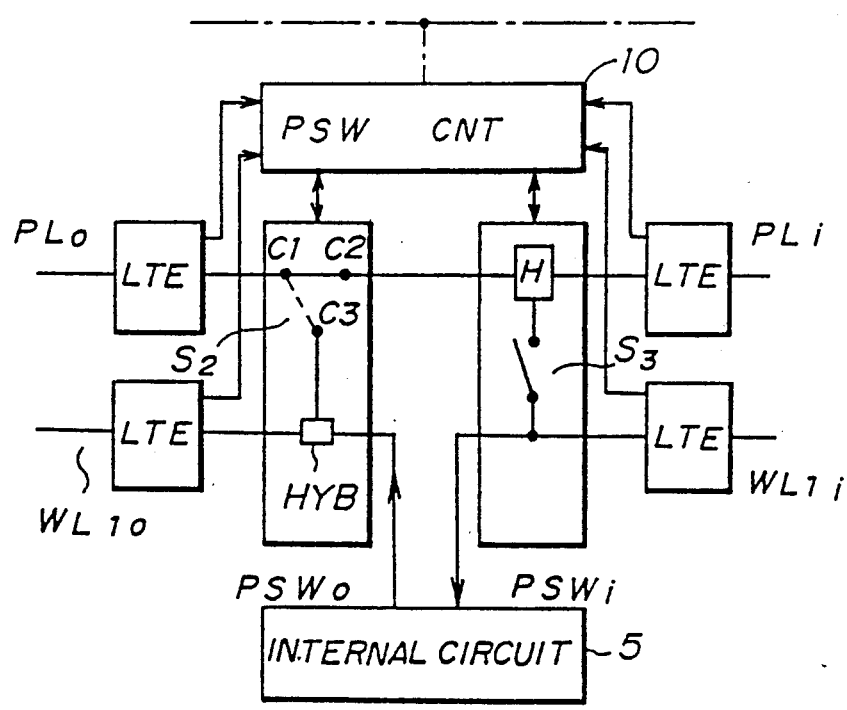
FIG. 7 is a block diagram of a drop/insert station according to a second embodiment of the present invention.

In each of the first, second and third embodiments of the present invention, it is possible to design the protection switch controllers 10 of the drop/insert stations so that they communicate with each other, as shown by the one-dot chain lines shown in FIGS. 4, 7 and 8. For example, the protection switch controller 10 shown in FIG. 4 sends each drop/insert station on its downstream and upstream sides a control signal which indicates the states of the switches S1 and S2. The protection switch controller 10 of each drop/insert station receives the control signal and determines the states of its own switches S1 and S2.

Figure 9:
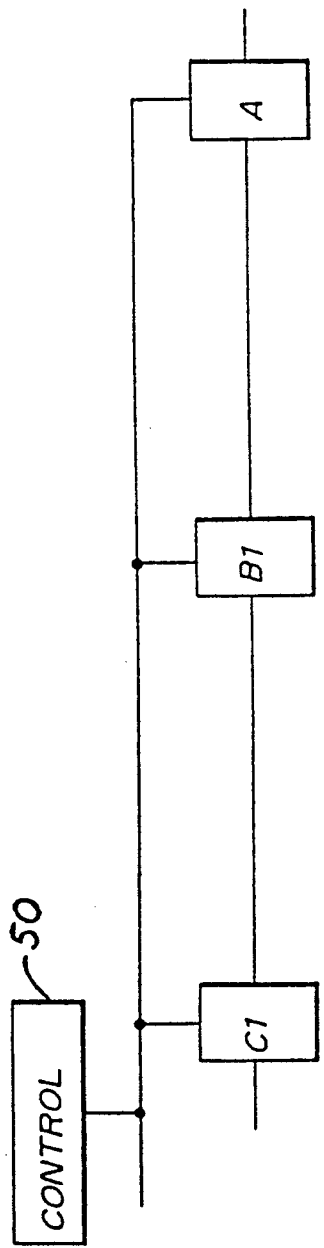
FIG. 9 is a block diagram of an alternative arrangement for controlling switches provided in each drop/insert station.

As shown in FIG. 9, it is also possible to provide a centralized control device 50 to which the protection switch controller 10 and each line terminating equipment of each station is connected. The centralized control device 50 recognizes the states of the switches of each station and the source of the alarm signal, and determines the states of the switches of each station.

Figure 10A:
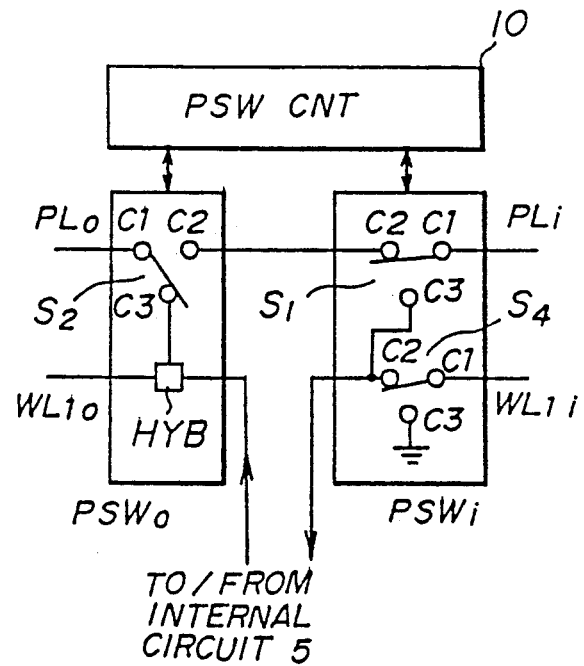
FIG. 10A is a diagram illustrating a modification of the first and third embodiments of the present invention.

It is preferable to provide the protection switch PSWi on the input side of each drop/insert station shown in FIGS. 4 and 8 with a switch S4 shown in FIG. 10A. The switch S4 is provided for the purpose of grounding the line in which a failure has occurred. The switch S4 has a movable contact C1 and two stationary contacts C2 and C3. The contact c1 of the switch S4 is connected to the working line WL1i. The contact C2 of the switch S4 is connected to the contact C3 of the switch S1 as well as the internal circuit 5. The contact C3 of the switch S4 is grounded. When the protection switch controller 10 receives the alarm signal generated and output by the line terminating equipment LTE in the working line WL1i, it controls the switch S4 so that the contacts C1 and C3 are connected to each other. When no failure occurs in the working line WL1i, the switch S4 connects the contacts C1 and C2.

Figure 10B:
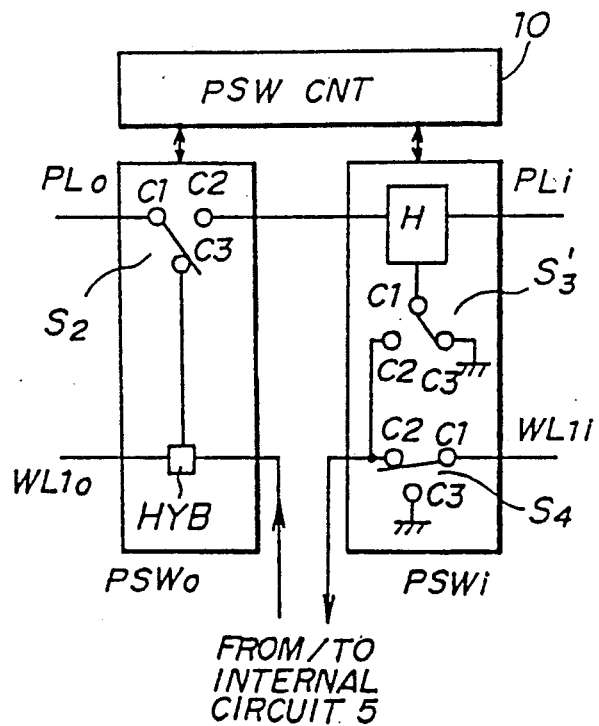
FIG. 10B is a diagram illustrating a modification of the second embodiment of the present invention.

It is also preferable that the protection switch PSWi shown in FIG. 7 be configured, as shown in FIG. 10B. The protection switch PSWi has a switch S3' having the function of the switch S3 (FIG. 7) and the switch S4. The switch S3' has a movable contact C1 and two stationary contacts C2 and C3. The contact c1 of the switch S3' is connected to the output side of the hybrid circuit H, and the contact C3 thereof is grounded. The contact C2 of the switch S3' is connected to the contact C2 of the switch S4 and the internal circuit 5.

Normally, one of the two outputs of the hybrid circuit HYB is grounded via the switch S3', and the switch S4 connects the working line WL1i and the internal circuit 5. When a failure in the working line WL1i is detected, the protection switch controller 10 controls the switch S3' to connect its contacts C1 and C2 to each other, and controls the switch S4 so that the working line WL1i is grounded.

In the aforementioned embodiments, signal transmitted on each working line is an optical multiplexed signal having a frequency of, for example 45 MHz. Each line terminating equipment LTE multiplexes a plurality of electrical signals to thereby generate an electrical multiplexed signal, and converts the electrical multiplexed signal into the optical multiplex signal. Each switch described above can be formed of a conventional switching element, such as a relay or a logic circuit. It will be noted that the present invention is not limited to an optical communication system. The above-mentioned embodiments can be applied to signal transmission in the reverse direction.

The present invention is not limited to the specifically disclosed embodiments, and variations and modifications may be made without departing from the scope of the present invention.

What is claimed is:

1. A communication system comprising:
   a plurality of stations;
   a first working line coupling adjacent stations among said plurality of stations;
   a second working line passing predetermined stations among said plurality of stations without dropping therein; and
   a protection line provided in common for said first working line and said second working line, a supervisory signal continuously passing through said protection line;
   each of said stations including:
   internal circuit means connected in said first working line for receiving an input transmission signal from said first working line at a downstream side thereof and sending an output transmission signal to said first working line at an upstream side thereof, and
   switching means connected to said internal circuit means and operated for passing said protection line without dropping in each of said stations in a normal mode and for connecting said protection line to said internal circuit means in an alarm mode so that the input transmission signal is received from said upstream side via said protection line and said supervisory signal which is generated from said output transmission signal is output toward said downstream side via said protection line.

2. A communication system as claimed in claim 1, wherein said switching means of each of said stations comprises:
   first switching means for passing said protection line without dropping in each of said stations in the normal mode and for connecting said protection line to said internal circuit means in the alarm mode so that said input transmission signal is received by said internal circuit means via said protection line; and
   second switching means for passing said protection line via said first switching means in the normal mode and for connecting said protection line to said internal circuit means in the alarm mode so that said supervisory signal is output toward the downstream side via said protection line.

3. A communication system as claimed in claim 2, wherein:
   said first switching means comprises a first switch having a first contact connected to said protection line, a second contact coupled to said second switching means, and a third contact connected to said internal circuit means;
   said first contact is connected to said second contact in the normal mode; and
   said first contact is connected to said internal circuit means in the alarm mode.

4. A communication system as claimed in claim 2, wherein said second switching means comprises:
   a switch having a first contact connected to said protection line, a second contact connected to said first switching means, and a third contact coupled to said internal circuit means, said first contact being connected to said second contact in the normal mode, and said first contact being connected to said third contact in the alarm mode; and
   coupling means for coupling said internal circuit means to both said first working line and said protection line.

5. A communication system as claimed in claim 3, wherein:
   said first switching means comprises a second switch having a first contact connected to said first working line, a second contact coupled to said internal circuit means, and a third contact which is grounded;

said first contact of said second switch is connected to said second contact thereof in the normal mode; and said first contact of said second switch is connected to said third contact thereof in the alarm mode.

6. A communication system as claimed in claim 4, wherein said coupling means comprises hybrid circuit means for coupling said internal circuit means to said first working line and said third contact of said switch.

7. A communication system as claimed in claim 3, further comprising:

failure detecting means for detecting a failure which has occurred in said first working line; and control means, coupled to said failure detecting means and said switching means, for controlling said first switch so that said first contact of said first switch is connected to said second contact thereof in the normal mode in which said failure detecting means does not detect said failure, and said first contact of said first switch is connected to said third contact thereof in the alarm mode in which said failure detecting means has detected said failure in said first working line.

8. A communication system as claimed in claim 5, further comprising:

failure detecting means for detecting a failure which has occurred in said first working line; and control means, coupled to said failure detecting means, for controlling said first switch so that said first contact of said first switch is connected to said second contact thereof in the normal mode in which said failure detecting means does not detect said failure and said first contact of said first switch is connected to said third contact thereof in the alarm mode in which said failure detecting means has detected said failure in said first working line and for controlling said second switch so that said first contact of said second switch is connected to said internal circuit means in the normal mode, and said first contact of said second switch is connected to said third contact of said second switch in the alarm mode.

9. A communication system as claimed in claim 2, wherein:

said first switching means comprises hybrid circuit means for coupling said protection line to said second switching means and said internal circuit means, and a first switch provided between said hybrid circuit means and said internal circuit means, and wherein:

said first switch has a first contact connected to said hybrid circuit means, and a second contact connected to said internal circuit means;

said first contact of said first switch is open in the normal mode; and said second contact of said first switch is closed in the alarm mode.

10. A communication system as claimed in claim 9, wherein:

said first switch has a third contact which is grounded; and said first contact of said first switch is connected to said third contact thereof in said normal mode, so that said hybrid circuit means is grounded via said first switch.

11. A communication system as claimed in claim 10; wherein:

said first switching means comprises a second switch having a first contact connected to said first working line, a second contact connected to said internal circuit means, and a third contact which is grounded;

said first contact of said second switch is connected to said second contact thereof in the normal mode; and said first contact of said second switch is connected to said third contact thereof, so that said first working line is grounded via said second switch.

12. A communication system as claimed in claim 10, further comprising;

failure detecting means for detecting a failure which has occurred in said first working line; and control means, coupled to said failure detecting means and said first switching means, for controlling said first switch so that said first contact of said first switch is connected to said third contact thereof in the normal mode in which said failure detecting means does not detect said failure, and said first contact of said first switch is connected to said second contact thereof in the alarm mode in which said failure detecting means has detected a failure in said first working line.

13. A communication system as claimed in claim 11, further comprising:

failure detecting means for detecting a failure which has occurred in said first working line; and control means, coupled to said failure detecting means and said first switching means, for controlling said first switch so that said first contact of said first switch is connected to said third contact thereof in the normal mode in which said failure detecting means does not detect said failure and said first contact of said switch is connected to said second contact in the alarm mode in which said failure detecting means has detected said failure in said first working line and for controlling said second switch so that said first contact of said second switch is connected to said second contact thereof in the normal mode, and said first contact of said second switch is connected to said third contact of said second switch in the alarm mode.

14. A communication system as claimed in claim 4, further comprising:

failure detecting means for detecting a failure which has occurred in said first working line; and control means, coupled to said failure detecting means and said second switching means, for controlling said second switch so that said first contact of said second switch is connected to said second contact thereof in the normal mode in which said failure detecting means does not detect said failure and said first contact of said second switch is connected to said third contact thereof in the alarm mode in which said failure detecting means has detected said failure in said first working line.

15. A communication system as claimed in claim 9, wherein said second switching means comprises:

a second switch having a first contact connected to said protection line, a second contact connected to said first switching means, and a third contact coupled to said internal circuit means, said first contact being connected to said second contact in the normal mode, and said first contact being connected to said third contact in the alarm mode; and coupling means for coupling said internal circuit means to both said first working line and said protection line, and wherein said communication system further comprises:

failure detecting means for detecting a failure which has occurred in said first working line; and control means, coupled to said failure detecting means and said second switching means, for controlling said second switch so that said first contact of said second switch is connected to said second contact thereof in the normal mode in which said failure detecting means does not detect said failure and said first contact of said second switch is connected to said third contact thereof in the alarm mode in which said failure detecting means has detected said failure in said first working line.

16. A communication system as claimed in claim 9, wherein said second switching means comprises:

a second switch having a first contact connected to said protection line, a second contact connected to said first switching means, and a third contact coupled to said internal circuit means, said first contact being connected to said second contact in the normal mode, and said first contact being connected to said third contact in the alarm mode; and coupling means for coupling said internal circuit means to both said first working line and said protection line, and wherein said communication system further comprises:

failure detecting means for detecting a failure which has occurred in said first working line; and control means, coupled to said failure detecting means and said second switching means, for controlling said second switch so that said first contact of said second switch is connected to said second contact thereof in the normal mode in which said failure detecting means does not detect said failure and said first contact of said second switch is maintained so as to be connected to said second contact thereof in the alarm mode in which said failure detecting means has detected said failure in said first working line.

17. A communication system as claimed in claim 1, wherein said input transmission signal is an optical multiplexed signal, and said output transmission signal is an optical multiplexed signal.

18. A communication system comprising:
a plurality of stations;
a first working line coupling adjacent stations among said plurality of stations;
a second working line passing predetermined stations among said plurality of stations without dropping therein; and
a protection line provided in common for said first working line and said second working line, a supervisory signal continuously passing through said protection line;
each of said stations including:
internal circuit means connected in said first working line, for receiving an input transmission signal from said first working line at a downstream side thereof and sending an output transmission signal to said first working line at a downstream side thereof, and
switching means for connecting said protection line to said internal circuit means in a normal mode so that said supervisory signal from said upstream side is dropped in each of said stations and for passing said protection line toward said downstream side without dropping therein in an alarm mode so that said protection line functions as said second working line.

19. A communication system as claimed in claim 18, wherein said switching means of each of said stations comprises:

first switching means for passing said protection line without dropping in each of said stations in the alarm mode and for connecting said protection line to said internal circuit means in the normal mode; and second switching means for passing said protection line via said first switching means in the alarm mode and for connecting said protection line to said internal circuit means in the normal mode.

20. A communication system as claimed in claim 18, wherein:

said first switching means comprises a switch having a first contact connected to said protection line, a second contact coupled to said second switching means, and a third contact connected to said internal circuit means;

said first contact is connected to said second contact in the alarm mode; and said first contact is connected to said internal circuit means in the normal mode.

21. A communication system as claimed in claim 19, wherein said second switching means comprises:

a switch having a first contact connected to said protection line, a second contact connected to said first switching means, and a third contact coupled to said internal circuit means, said first contact being connected to said second contact in the alarm mode, and said first contact being connected to said third contact in the normal mode; and coupling means for coupling said internal circuit means to both said first working line and said protection line.

22. A communication system as claimed in claim 21, wherein said coupling means comprises hybrid circuit means for coupling said internal circuit means to said first working line and said third contact of said switch.

23. A communication system as claimed in claim 19, further comprising:

failure detecting means for detecting a failure which has occurred in said second working line; and control means, coupled to said failure detecting means and said first switching means, for controlling said switch so that said first contact of said switch is connected to said second contact thereof in the alarm mode in which said failure detecting means does not detect said failure, and said first contact of said switch is connected to said third contact thereof in the normal mode in which said failure detecting means has detected said failure in said first working line.

24. A communication system as claimed in claim 18, wherein said input transmission signal is an optical multiplexed signal, and said output transmission signal is an optical multiplexed signal.

* * * * *